United States Patent
Haillot

(10) Patent No.: US 9,404,419 B2
(45) Date of Patent: Aug. 2, 2016

(54) METHOD FOR OPTIMIZING THE OPERABILITY OF AN AIRCRAFT PROPULSIVE UNIT, AND SELF-CONTAINED POWER UNIT FOR IMPLEMENTING SAME

(75) Inventor: Jean-Michel Haillot, Beuste (FR)

(73) Assignee: TURBOMECA, Bordes (FR)

( * ) Notice: Subject to any disclaimer, the term of this patent is extended or adjusted under 35 U.S.C. 154(b) by 586 days.

(21) Appl. No.: 13/816,965

(22) PCT Filed: Aug. 23, 2011

(86) PCT No.: PCT/FR2011/051944
§ 371 (c)(1),
(2), (4) Date: Feb. 14, 2013

(87) PCT Pub. No.: WO2012/025688
PCT Pub. Date: Mar. 1, 2012

(65) Prior Publication Data
US 2013/0139522 A1    Jun. 6, 2013

(30) Foreign Application Priority Data

Aug. 25, 2010    (FR) .................................... 10 56764

(51) Int. Cl.
*F02C 1/00*    (2006.01)
*F02C 6/08*    (2006.01)
(Continued)

(52) U.S. Cl.
CPC . *F02C 6/08* (2013.01); *B64D 41/00* (2013.01); *F02C 3/13* (2013.01); *F02C 7/32* (2013.01); *B64D 2013/0611* (2013.01); *F05D 2220/50* (2013.01); *Y02T 50/53* (2013.01)

(58) Field of Classification Search
CPC ................ F02C 6/08; F02C 9/28; F02C 9/16; F02C 9/46; F02C 7/32; F02C 7/36; F05B 2220/50; F01D 15/10
See application file for complete search history.

(56) References Cited

U.S. PATENT DOCUMENTS

| 3,965,673 A | 6/1976 | Friedrich |
| 4,912,921 A | 4/1990 | Rice et al. |

(Continued)

FOREIGN PATENT DOCUMENTS

| EP | 0 738 655 | 10/1996 |
| EP | 1 630 099 | 3/2006 |

(Continued)

OTHER PUBLICATIONS

International Search Report Issued Feb. 16, 2012 in PCT/FR11/51944 Filed Aug. 23, 2011.

*Primary Examiner* — Gerald L Sung
(74) *Attorney, Agent, or Firm* — Oblon, McClelland, Maier & Neustadt, L.L.P.

(57) ABSTRACT

A method for optimizing operability of an aircraft propulsive unit, and a self-contained power unit implementing the method. The method removes mechanical bleed constraints in engines during transient flight phases of an aircraft to optimize operability of the engine assembly during the phases. To this end, a supply of power is provided, particularly during the phases, by an additional indirectly propulsive engine power source. The method for optimizing operability of the propulsive unit of an aircraft including main engines as main drive sources includes, using a main engine power unit GPP as a power source, providing all the non-propulsive power and, during the transient engine phases, at most partially providing additional power to the body of the main engines.

11 Claims, 3 Drawing Sheets

(51) Int. Cl.
*B64D 41/00* (2006.01)
*F02C 3/13* (2006.01)
*F02C 7/32* (2006.01)
*B64D 13/06* (2006.01)

(56) References Cited

U.S. PATENT DOCUMENTS

| | | | |
|---|---|---|---|
| 5,239,830 A | 8/1993 | Banthin et al. | |
| 5,363,641 A * | 11/1994 | Dixon et al. | 60/778 |
| 5,511,385 A * | 4/1996 | Drew et al. | 62/172 |
| 5,813,630 A * | 9/1998 | Williams | 244/118.5 |
| 5,860,283 A | 1/1999 | Coleman et al. | |
| 6,023,134 A * | 2/2000 | Carl et al. | 318/140 |
| 6,283,410 B1 | 9/2001 | Thompson | |
| 2004/0129835 A1 | 7/2004 | Atkey et al. | |
| 2005/0103931 A1 * | 5/2005 | Morris et al. | 244/58 |
| 2006/0102790 A1 | 5/2006 | Atkey et al. | |
| 2006/0231680 A1 | 10/2006 | Derouineau et al. | |
| 2007/0267540 A1 | 11/2007 | Atkey et al. | |
| 2007/0284480 A1 | 12/2007 | Atkey et al. | |
| 2008/0098743 A1 | 5/2008 | Judd | |
| 2009/0314002 A1 * | 12/2009 | Libera et al. | 60/778 |
| 2011/0188989 A1 | 8/2011 | Judd | |
| 2012/0153076 A1 * | 6/2012 | Burns et al. | 244/58 |

FOREIGN PATENT DOCUMENTS

| | | |
|---|---|---|
| EP | 1 728 990 | 12/2006 |
| EP | 1 918 202 | 5/2008 |
| GB | 2 216 603 | 10/1989 |
| JP | 2008-080934 A | 4/2008 |

* cited by examiner

METHOD FOR OPTIMIZING THE OPERABILITY OF AN AIRCRAFT PROPULSIVE UNIT, AND SELF-CONTAINED POWER UNIT FOR IMPLEMENTING SAME

TECHNICAL FIELD

The invention relates to a method for optimizing the operability of the engine set of an aircraft, as well as a main power unit capable of implementing such a method.

The invention applies to the engine set of aircrafts, that is essentially to the engine set of airplanes (jet engines, turbojet engines, turboprops) as well as to the engine set of helicopters (turboshaft engine).

An aircraft engine comprises, typically and in a simplified way, a compressor-chamber of combustion-turbine set forming a gas generator. After their combustion, the hot gases expand in the turbine which mechanically drives the compressor via a high-pressure (HP in an abbreviated form) shaft or HP body, and they supply potential energy.

In the case of an airplane, this potential energy generates the propulsion energy in the form of thrust, either directly (in jet engines) or indirectly via the LP low-pressure body (in turbojet engines with fan or turboprops with propeller). In the case of a helicopter, this propulsion energy is transmitted to the rotary wing through a main transmission gearbox (generally known as MGB). Turbine engines produce energy within the time corresponding to a level of instantaneous power transmission.

The flows of air in the compressor and the turbine can cause, in certain operating conditions, a phenomenon referred to as compressor surge which makes the hot gases from the gas generator go back towards the air inlet of the compressor and can lead to the most serious consequences (sudden drop in the lift, reversal of thrust, breaking of the blades, destruction of the engine). It is thus necessary to keep some surge margin. Such a phenomenon is to be banned in the aeronautical field.

For each flight phase, a surge line can be drawn dependent on the air intake/outlet pressure ratio and the air-flow rate. The working line of the engine must stay below this surge line in order to avoid, in particular, any thrust loss. The difference between the working line and the surge line, called surge margin, decreases when the HP-body speed is low.

The surge margin decreases all the more so as mechanical bleeds are taken from the HP bodies to feed the electric and hydraulic equipments (alternators, pump, etc.). The present specifications tend towards a substantial increase in these bleeds. Now a sufficient surge margin must make it possible to accelerate the HP body when the flight circumstances require to re-throttle up.

A similar functioning is expected as far as helicopter turboshaft engines are concerned. However, in the case of a failure of an engine ("One Engine Inoperative", OEI in the abbreviated form), a rapid acceleration is required from the HP body of the sound engine.

STATE OF THE ART

Generally, the importance of the needs for mechanical bleeds limits the acceleration capacities of the engines during transient phases, i.e. the operability of the power source. To obtain the intended accelerations, it would be useful to increase the surge margin by lowering the working line. It would be also possible to bleed air from the main engine. But then, in either case, the overall efficiency of the turbine engine is substantially modified.

The aircraft being an isolated system, the only solution is to temporarily limit the requests for mechanical bleed from the HP body. But the consequences can be harmful to the equipment and to the functions fulfilled by the equipments (cabin air conditioning, landing gear, etc.).

DISCLOSURE OF THE INVENTION

The invention aims at removing the constraint of mechanical bleed in the engines during the transient phases in order to optimize the operability of the engine group during these phases. To do this, power is supplied, especially during these phases, by an additional, engine-type, power source, supplying indirectly-propulsive power. A power-generating means is said to be of the engine type when the architecture and the performance of this power-generating means are fit for the certification as engine usable during all flight phases, in the same way as a power-generating means serving as an aircraft main engine.

More precisely, the object of the present invention is method for optimizing the operability of the engine set of an aircraft including main engines as main drive sources. Such an optimization consists, by means of an engine-type main power source as a drive source, in supplying the totality of the non-propulsive energy and, during the transient phases of the engines, in supplying at most partially an additional power to the high-pressure body HP of the main engines. The transient phases of the engines are especially acceleration phases, failure cases and functioning at idle speed.

According to preferred embodiments, the power supplied to the HP body of the main engines is produced by an electric generator fitting the main power source in collaboration with an electric starter of the main engines converted into a drive—like during the ground start of the main engines—or by ways of a bleed of compressed air from the main power source in collaboration with an air starter of the main engines.

In particular, the main power source can provide power to the HP body of the main engines in order to obtain higher acceleration rates with, possibly, an idle adjusted at a lower level than the nominal idle.

More particularly, in airplane use, in the phase of flight descent as a transient phase, the main power source supplies power to the HP body of the main engines. An optimized operability is then achieved, in terms of capacity of maximized acceleration, by an increase of the surge margin of the main engines in a flight phase where this margin would be minimal without supply of additional power, with a working line at the nearest to surge.

More particularly, in helicopter use, in the event of a failure of a main engine, the main power source supplies the electric power to the HP body of the sound main engine so that the latter can have an acceleration capacity such that its surge margin is sufficient. Consequently, the surge margin is thus preserved while the operability has become optimal.

Thus, in aircraft use, in steady-state phase as well as in transient phase, the main power source supplies power to the HP body of the main engines.

The invention also relates to a main power unit, hereinafter: MPU, capable of optimizing the operability of the engine set of an aircraft according to the above method. Such a main power unit is based on a power unit of the auxiliary power unit type, in an abbreviated form: APU, which has been made more reliable in order to belong to the engine category, and combined with means for regulating the compressed air in the cabin.

APUs usually fit aircrafts in order to feed the various energy-consuming equipments (electric, pneumatic and hydraulic power, air conditioning) on the ground, and start the main engines. When an engine is out of order, some APUs have been sufficiently secured so that they are able to start up again for trying to restart the failing engine during the flight and/or to supply part of the electric energy to the equipments in flight.

APUs typically consist of a gas generator and means for driving the equipments (supercharger, fuel and hydraulic pumps, electric generator and/or electric starter/generator, etc.) directly or via a power-transfer box with rotational-speed adaptation. An air bleed at the outlet side of the supercharger or intake compressor is used for pneumatically starting the main engines.

The use of an APU, even secured, during the flight phases to supply non-propulsive energy should be considered as unrealistic because of an unfavourable energy efficiency in comparison with the main engines: operating an APU during the whole flight duration is fuel-consuming.

Now, if the APU is converted into an engine-type power unit for permanently supplying pneumatic energy according to the strict requirement of the cabin, then an aircraft having such a unit offers a favourable balance and makes it possible to optimize the operability of the engine set of the aircraft.

As such, in an aircraft including energy-consuming equipments—in particular: a cabin the air of which is renewed and the temperature and/or pressure of which are regulated by means of a regulation system ECS; main power-generating engines; and a flight control unit—, a main power unit according to the invention—built into a compartment which is insulated from the other zones of the aircraft and fitted with an outside-air intake and an exhaust nozzle—includes an engine-type power unit of the above described type fitted with a gas generator and with a power turbine for driving equipments including a supercharger. The supercharger is coupled, via a regulation control which communicates with the control unit, with the ECS system in order to supply the necessary pneumatic energy to the cabin.

According to particular embodiments:
- the main power unit is coupled with a recovery structure that includes an energy-recovery turbine for driving the equipments with the power turbine and that is coupled, on the air-inlet side, with the outlet of the cabin in order to cool, on the air-outlet side, the equipments, the supercharger being built into this recovery structure as a supplier of pneumatic energy to the cabin.
- the recovery turbine (13) ejects, on the outlet side, an air flow into the compartment of the main power unit which, after it has cooled the equipments and auxiliary equipments contained in the aft compartment, is evacuated into the exhaust nozzle by a jet pump action resulting from the efflux velocity of the hot air flow coming out of the power turbine.
- the recovery turbine is coupled with a soundproofing device in order to avoid the propagation of wind noises into the cabin;
- means for transmitting power from the power and recovery turbines to the mechanical, pneumatic, hydraulic and/or electric equipments of the aircraft are provided, in particular in the form of a power-transfer box.
- the recovery structure comprises a heat exchanger having two heat-transfer circuits: a primary circuit connected, on the inlet side, with the hot-air-flow outlet of the power turbine and, on the outlet side, with the exhaust nozzle; and a secondary circuit connected, on the inlet side, with an air-flow outlet of the cabin and, on the outlet side, with the recovery turbine.

In these conditions, energy recovery on the outlet side of the cabin—in the form of pressure and/or temperature—is optimized thanks to the proximity to the main power source, while ensuring an air outflow on the outlet side of the cabin with a controlled back-pressure in the cabin. Besides, connecting the energy recovery means to a main power-generating source, and not to a mere compressor or an alternator, makes it possible to absorb overspeeds that can start in the event of a failure thanks to the inertia resulting from the mass effect due to the components of the power-generating source and all the consumers.

Furthermore, recovering energy on the outlet side of the cabin can be undertaken by supplementing the potential energy contained in the air outflow from the cabin by the thermal energy used to cool systems dedicated to aircraft equipments before being further enriched by heat exchange between the aforementioned air flows.

BRIEF DESCRIPTION OF THE DRAWINGS

Other aspects, characteristics and advantages of the invention will appear in the following non-restrictive description of particular embodiments, in reference to the accompanying drawings which show respectively.

DETAILED DESCRIPTION OF EMBODIMENTS

In all the Figs., identical or similar elements having the same function are identified with identical or similar reference marks.

Figure 1:
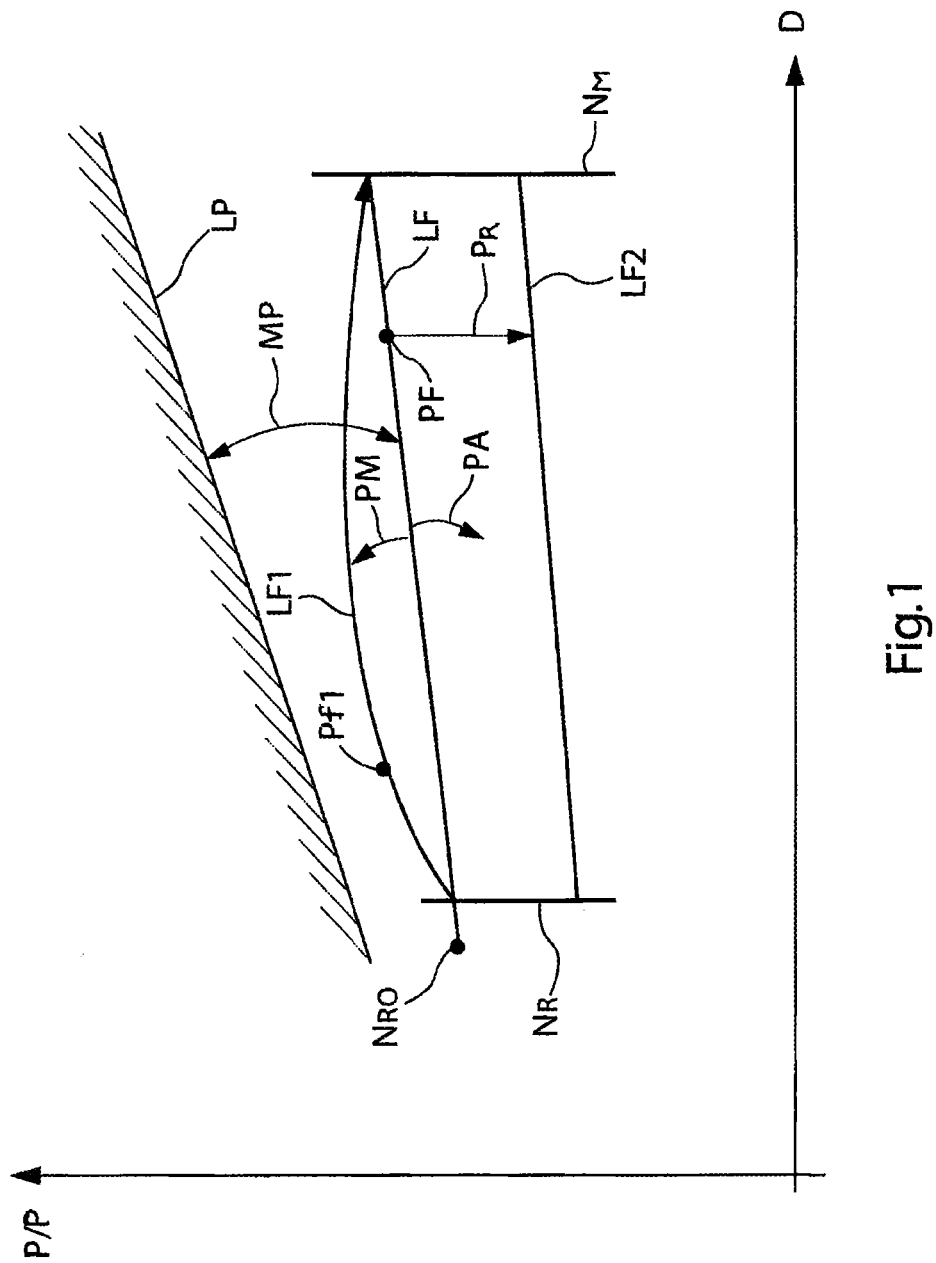
FIG. 1, a graph of the variations of the working line of an aircraft engine.

In reference to FIG. 1, the graph of the variations in the working line LF of an aircraft engine is showed in a system of reference of the air pressure ratio P/P dependent on the adjusted air-flow rate D for a given flight phase. The air-flow rate is said to be adjusted in order to enable a significant graphic representation including the influence of the various bearing parameters. A surge line LP and the working lines LF, LF2 of the engine are shown in this system of reference. The working line LF stays below this surge line LP in order to avoid any thrust loss. The surge margin MP, i.e. the difference between the working line and the surge line, decreases with the speed (or air-flow rate) of the engine HP body, for example from the maximal speed $N_M$ down to the idling speed $N_R$ which are permissible for this flight phase.

A reduced surge margin increases the efficiency of the engine but can entail risks of surge if the working line gets too close to the surge line. For example, during an acceleration starting from the idling speed $N_R$, the working points Pf1 in transient describe, on the graph, the working line LF1 from $N_R$ to $N_M$. The decrease of the surge margin MP along this line LF1 is due to the fuel injection into the combustion chamber necessary for the acceleration of the HP body. The position of point Pf1 showed on the graph corresponds to the minimal surge margin. Mechanical bleeds from the HP body to feed equipments (arrow PM) also reduce the surge margin. The present specifications tend towards a substantial increase of said bleeds which substantially increase the risks of surge.

Overshoots during accelerations is thus delicate to handle. Besides, air bleeds (arrow PA), for instance at the level of the engine compressor, in order to supply energy to other equipments (cabin air conditioning, etc.) increase the surge margin. The working line migrates then from line LF to line LF2, this migration resulting in a loss of efficiency at constant flow rate as shown by arrow $P_R$.

An optimized operability is achieved by a supply of power from a main source, in terms of maximized capacity of acceleration: such a supply makes it possible to increase the power provided to the HP body shaft by simultaneously supplying power by fuel injection into the chamber of combustion and power from the MPU. This additional supply increases the acceleration rate of the HP body, while maintaining the surge margin MP of the main engines in a flight phase whereas this margin would at its minimum without the supply of additional power, with a working line LF at the nearest to surge. Furthermore, this additional supply makes it possible to reduce the idling speed $N_R$ while the surge margin stays identical in transient phase. Besides, such a supply makes it possible, in steady-state phase, to maintain an idle level $N_{RO}$ lower than that determined by the capacity of autonomy of the gas generator.

In the absence of a main power unit, each main engine supplies, equally in nominal conditions, propulsive energy Ep and of non-propulsive energy Enp. As it appears in detail hereinafter, a MPU can distribute the totality or part of the non-propulsive energy between each main engine and the MPU. This MPU also provides a few percent of propulsive energy while supplying power to the HP body of the main engines in transient phases, in particular in the event of a failure a main engine.

Figure 2A:
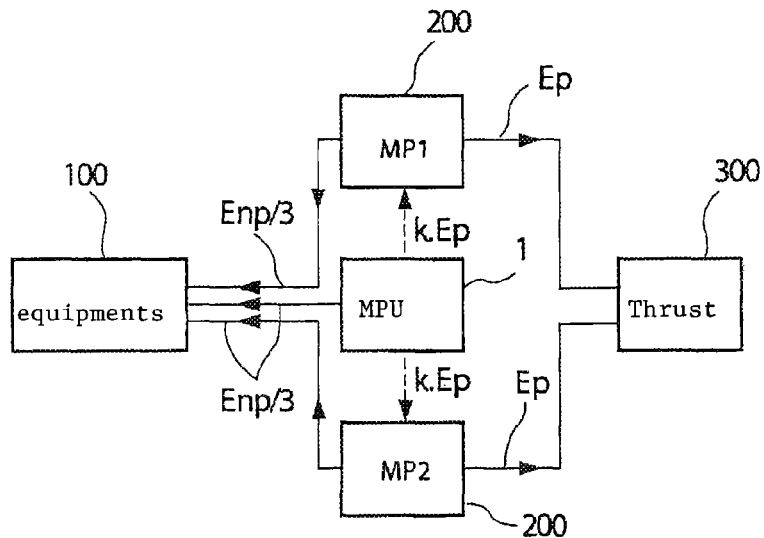
FIGS. 2a and 2b, two block diagrams of the distribution of the propulsive and non-propulsive energies, notably in transient phase (FIG. 2b), supplied by the main engines and the main power unit of an aircraft in nominal flight.

In reference to FIG. 2a, relating to an initial state in steady-state flight of an aircraft, the non-propulsive energy Enp is supplied to the equipments 100 by the main engines 200, MP1 and MP2, as well as by the MPU 1 according to an equally dividing Enp/3. This equally dividing is also recommended to define the sizing points of the turbine engines. In a phase of descent, during which the main engines are not needed, it is preferable that the non-propulsive energy should be mainly or totally supplied by the MPU.

Figure 2B:
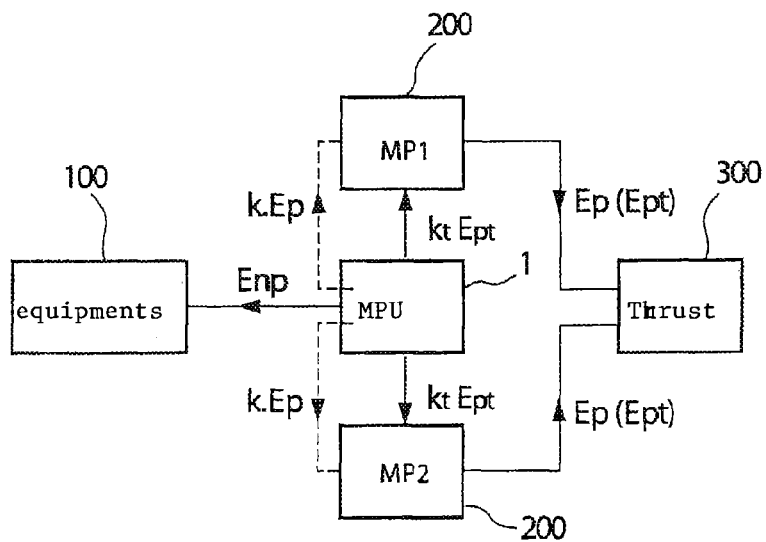

As a variant (FIG. 2b), the non-propulsive energy Enp is supplied only by the MPU 1 in nominal flight in order to enable the switching means (in particular, the electric switches) to have enough response time in the event of a failure of an engine. Indeed, response times during accelerations to be supplied by a single engine can be insufficient if said engine does not mobilize its whole power (see below the case of engine failure).

Besides, the thrust 300 (2xEp) in nominal flight is equally supplied by each of the main engines. The MPU 1 can provide a proportion of propulsive energy kxEp by supplying power to each of the engine HP bodies, where k can amount a few percentage points.

Figure 3:
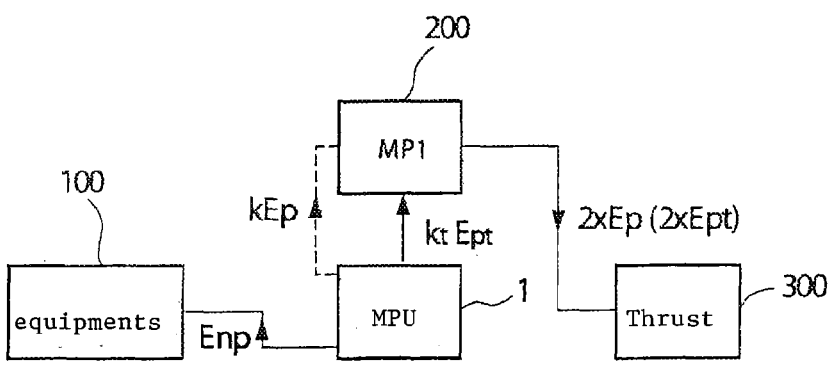
FIG. 3, a block diagram of the distribution of the energies in the event of a failure of a helicopter engine.

In the event of a failure of an engine MP2 in an aircraft, in particular a helicopter fitted with a MPU 1, as shown in the example of FIG. 3, the remaining sound MP1 engine 200 is at first configured to supply the whole propulsive energy: its share in the supply of non-propulsive energy Enp to the equipments 100 goes then from Enp/3 (no failure of the other engine, see FIG. 2a) down to 0xEnp, and its supply in propulsive energy goes from Ep up to 2xEp in order to produce the whole thrust 300. The MPU 1 is then configured to supply all the non-propulsive energy Enp, while increasing from Enp/3 to Enp. Advantageously, the MPU 1 continues to supply a proportion kxEp of propulsive energy to the HP body of the sound engine with an adjusted coefficient k and an acceleration rate such that the surge margin of the sound engine should be sufficient. In transient, the adjusted coefficient has a value $k_t$ and the MPU supplies then a transient propulsive energy $k_t$Ept to the HP body of the sound engine MP1 which supplies the whole thrust 2xEpt.

In the case of an aircraft in transient flight phases (FIG. 2b), particularly an airplane, the MPU 1 provides transient propulsive energy $k_t$Ept, with a coefficient $k_t$, to the HP body of each of the main engines 200 supplying 1xEpt, 2xEpt being the total propulsive energy to be supplied in transient phase. The MPU still supplies the totality of the non-propulsive energy, i.e. Enp, beyond the energy 2$k_t$Ept.

The power supplied to the HP body of the main engines is produced by the generator, in this case an alternator, fitting the MPU in collaboration with the electric starter of the main engines converted into a drive, like during the ground start of the main engines.

In particular, the MPU provides power to the HP body of the main engines so as to carry out accelerations with an idle level adjusted at the lowest.

Figure 4:
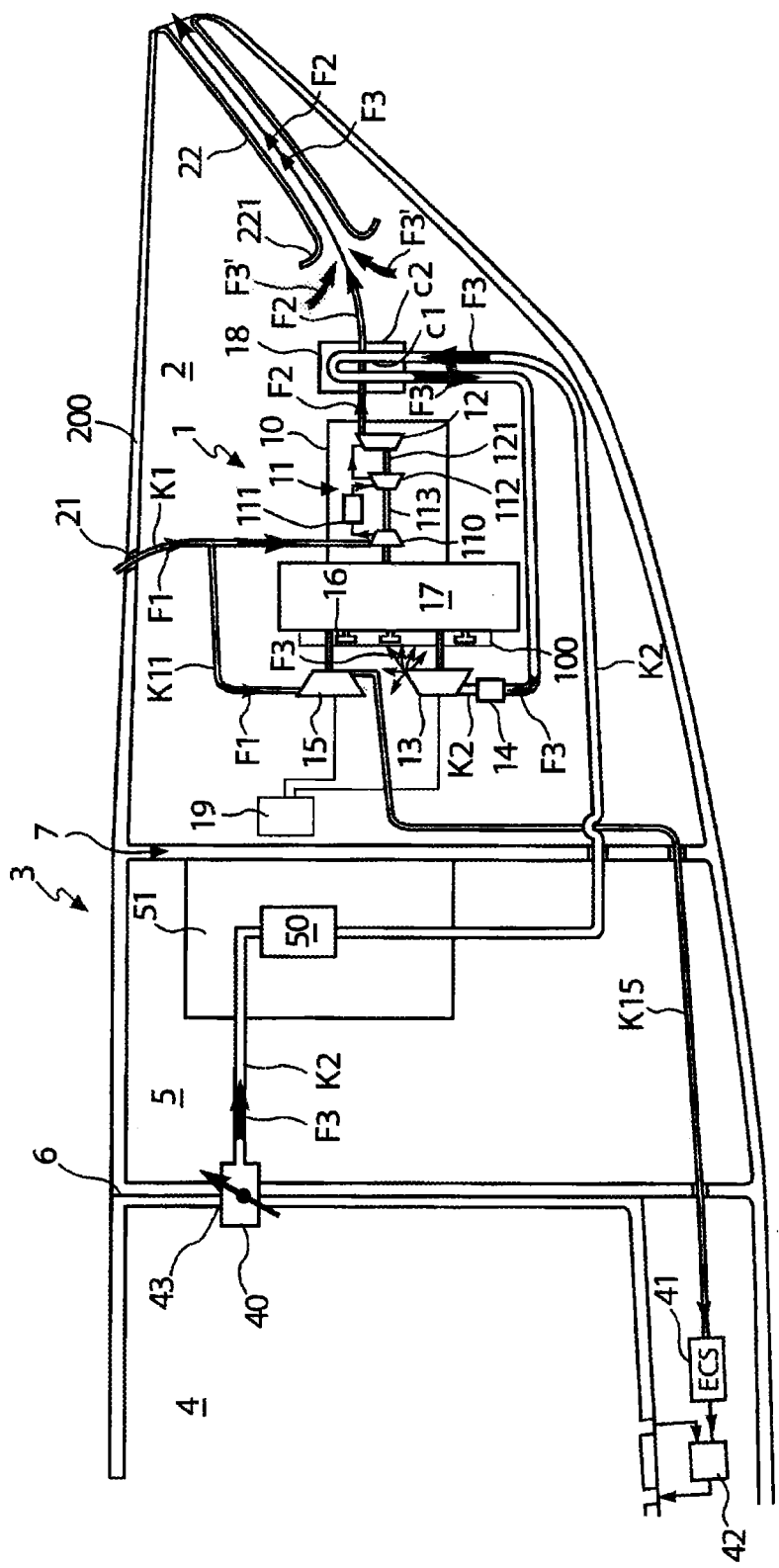
FIG. 4, a diagram of an example of a main power unit according to the invention in an aircraft aft compartment, in connection with an aircraft cabin fitted with an environmental control system ECS.

In reference to FIG. 4 showing a schematic diagram, a MPU 1 is arranged in an aft compartment 2 situated in the downstream part of the aircraft 3. The passenger cabin 4 is situated upstream and coupled with the aft compartment 2 via an intermediate compartment 5. A pressure bulkhead 6 separates the cabin 4 from the intermediate compartment and a fireproof bulkhead 7 insulates the intermediate compartment 5 from the aft compartment 2, which is fitted with an outside-air intake 21 and an exhaust nozzle 22.

The MPU 1 includes an engine 10, of the APU type but of the engine category, combined with an energy-recovery structure. The auxiliary engine consists of: a gas generator or HP body 11, including an intake compressor 110 for an air flow F1 coming from the air intake 21; a combustion chamber 111; and a turbine 112 for driving the compressor 110 by means of a HP shaft 113. This gas generator is coupled, on the inlet side, with an air-flow duct K1 mounted on the outside-air intake 21 and, on the outlet side, with a power turbine 12 which produces a hot air flow F2, typically of about 500 to 600° C.

The energy-recovery structure is centred on a recovery turbine 13 in connection with a soundproofing device 14, in order to avoid the propagation of the wind noises outside the compartment, in particular into the cabin.

This recovery turbine 13 is coupled with the power turbine 12 for driving equipments 100—mechanical, pneumatic (compressors), electric (alternators) and/or hydraulic (pumps)—especially a supercharger 15 and a starter/generator 16, via a power-transfer box 17 in the example. This box 17 is fitted with gearboxes and bevel gears (not shown) suitable for power transmission. The power turbine 12 supplies its power to the box 17 via a shaft 121, i.e. a through-going shaft in the illustrated example. Alternatively this shaft can be a non-through-going shaft or an outside shaft via an appropriate box of reduction (not shown). This box is advantageously fitted with a freewheel intended for its disconnection in the non-recovery phases (for example in the case of an open airplane cabin door).

The supercharger 15 supplies an environmental control system, called ECS system, 41 of the cabin 4 with air and transfers thereto, via a recycling mixing valve 42, compressed air coming from the outside-air intake 21 through a branch K11 of duct K1. The supercharger 15 is regulated by a regulation control 19 which communicates with the control unit (not shown) so as to supply the necessary pneumatic energy to the cabin. As a variant, the intake compressor 110 can serve as a supercharger 15 by appropriately bleeding air.

At least one variable valve 40, called cabin-pressure-regulation valve, circulates air flow F3 from the outlet 43 of the cabin 4 to the energy-recovery structure via duct K2. Advantageously, duct K2 goes into the intermediate compartment 5 so that air flow F3 cools the power electronics 50 inside a cabinet 51—these auxiliary equipments being dedicated to various systems made for the functioning of the aircraft (landing gear, etc.), which, of course, are non-operational when the cabin door is open. At the outlet of the compartment 5, air flow F3 has a temperature about 40° C.

The recovery structure comprises, in this example, a heat exchanger 18 fitted with a primary circuit C1, connected, on the inlet side, with the outlet of hot air flow F2 and, on the outlet side, with the nozzle 22—the temperature of flow F2 being then typically reduced from ca. 550° C. to 300° C.—and with a secondary circuit C2 connected, on the inlet side, with air flow F3 coming from the cabin 4 and, on the outlet side, to the recovery turbine 13. Flow F3 has then a temperature substantially higher than at the inlet (approximately 40° C.), for example of the order of 150° C. At the outlet of the recovery turbine 13, air flow F3 is dispersed in the aft compartment 2 in order to cool the equipments 100 (down to approximately 40° C.) and then collected in the form of flow F3', by reflection on walls 200 of the compartment, into the nozzle 22. Collection takes place because of a jet pump action, at the widened intake 221 of this nozzle, resulting from the efflux velocity of hot air flow F2, coming from the power turbine 12, at the outlet of the heat exchanger 18.

The invention claimed is:

1. A method for optimizing operability of an engine set of an aircraft including main engines as main drive sources, the method comprising:
   by a main power source including an engine other than the main engines as a drive source, producing a totality of non-propulsive energy including during a phase of operating the main engines when none of the main engines have failed; and
   during one or more transient phases of the main engines, producing a portion of propulsive energy less than a totality of the propulsive energy, by the main power source supplying a power to a high-pressure body of the main engines to increase a surge margin between a working line of at least one of the main engines and a surge line of the at least one of the main engines.

2. An optimization method according to claim 1, in which the power supplied to the high-pressure body of the main engines is produced by an electric generator fitting the main power source in collaboration with an electric starter of the main engines converted into a drive.

3. An optimization method according to claim 1, in which the power supplied to the high-pressure body of the main engines is produced by a bleed of compressed air from the main power source in collaboration with an air starter of the main engines converted into a drive.

4. An optimization method according to claim 1, in which the main power source provides the power to the high-pressure body of the main engines to increase an acceleration rate.

5. An optimization method according to claim 4, in which the acceleration rate that is increased is associated with an idle adjusted at a lower level than an idle determined by a capacity of autonomy of a gas generator of the main engines.

6. An optimization method according to claim 1, in which, in a steady-state phase as well as in a transient phase, the main power source supplies the power to the high-pressure body of the main engines through energy supplies corresponding to the phase.

7. An optimization method according to claim 1, in which, in an event of a failure of a main engine, the main power source supplies power to the high-pressure body of a sound main engine so that the sound main engine has an acceleration rate such that a surge margin of the sound main engine permits acceleration of the high-pressure body of the sound main engine when a flight circumstance requires a re-throttle up.

8. An optimization method according to claim 1, in which the one or more transient phases of the main engines include at least one of acceleration phases, failure cases, and functioning at an idle speed.

9. An optimization method according to claim 1, in which the aircraft includes energy-consuming equipment, a cabin in which air is renewed and temperature and/or pressure of which are regulated by a regulation system, and a flight control unit, the main power source being built into a compartment insulated from other zones of the aircraft with a fireproof bulkhead and fitted with an outside-air intake and an exhaust nozzle, and
   the main power source is fitted with a gas generator and with a power turbine, the method further comprising:
   by the power turbine, driving the equipment including a supercharger, the supercharger being coupled, via a regulation control which communicates with the control unit, with the regulation system to supply necessary pneumatic energy to the cabin.

10. An optimization method according to claim 9, in which the main power source is coupled with a recovery structure that includes an energy-recovery turbine to drive the equipment with the power turbine and that is coupled, on an air-inlet side, with an outlet of the cabin, the supercharger being built into this recovery structure as a supplier of the pneumatic energy to the cabin, the method further comprising:
   by the energy-recovery turbine, cooling, on an air-outlet side, the equipment.

11. An optimization method according to claim 10, further comprising:
   by the energy-recovery turbine, ejecting, on the air-outlet side, an air flow into the compartment of the main power source which, after the air flow has cooled the equipment and auxiliary equipment contained in an aft compartment, and evacuating the air flow into an exhaust nozzle by a jet pump action resulting from efflux velocity of hot air flow coming out of the power turbine.

* * * * *